Figure 1:
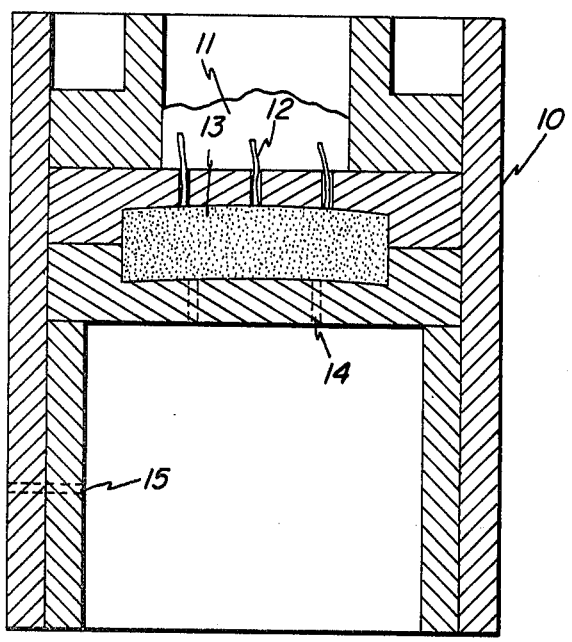

United States Patent [19]

Hillig et al.

[11] 4,148,894
[45] Apr. 10, 1979

[54] METHOD OF MAKING MOLTEN SILICON INFILTRATION REACTION PRODUCTS AND PRODUCTS MADE THEREBY

[75] Inventors: William B. Hillig, Ballston Lake; Charles R. Morelock, Ballston Spa, both of N.Y.

[73] Assignee: General Electric Company, Schenectady, N.Y.

[21] Appl. No.: 849,186

[22] Filed: Nov. 7, 1977

Related U.S. Application Data

[62] Division of Ser. No. 660,261, Feb. 23, 1976, Pat. No. 4,120,731.

[51] Int. Cl.² .................. B32B 15/16; B32B 15/18
[52] U.S. Cl. ............................ 428/242; 428/244; 428/408; 428/539
[58] Field of Search ............ 428/408, 367, 368, 539, 428/241, 242, 244, 472

[56] References Cited

U.S. PATENT DOCUMENTS

| 2,992,127 | 7/1961 | Jones | 428/408 |
|---|---|---|---|
| 3,095,316 | 6/1963 | Hatwig | 428/408 |
| 3,131,089 | 4/1964 | Grulke et al. | 428/408 |
| 3,458,341 | 7/1969 | Diefendorf | 428/408 |
| 3,462,340 | 8/1969 | Hough | 428/408 X |
| 3,955,038 | 5/1976 | Lindstrom et al. | 428/539 X |
| 4,035,541 | 6/1977 | Smith et al. | 428/539 X |
| 4,119,189 | 10/1978 | Ehrenreich | 428/368 |

Primary Examiner—Harold Ansher
Attorney, Agent, or Firm—William A. Teoli; Joseph T. Cohen; Charles T. Watts

[57] ABSTRACT

Infiltration reaction products are provided of molten silicon and certain blends of particulated carbon and various particulated inorganic materials substantially unreactive to molten silicon, such as boron nitride particles. These molten silicon infiltration products of reaction are readily machinable and can be applied, or formed in-situ as contiguous layers on silicon carbide, or silicon-silicon carbide substrates, etc., to produce multilayer composites having an improved strength over the base refractory structure.

8 Claims, 4 Drawing Figures

METHOD OF MAKING MOLTEN SILICON INFILTRATION REACTION PRODUCTS AND PRODUCTS MADE THEREBY

This is a division of application Ser. No. 660,261, filed Feb. 23, 1976, now U.S. Pat. No. 4,120,731.

The present invention relates to a method for making infiltration products of reaction of molten silicon and blends of particulated carbon and a particulated inorganic material, such as boron nitride particles. More particularly, the present invention relates to readily machinable silicon carbide compositions, and composites of such compositions as a contiguous layer on a silicon carbide base structure.

As shown in copending application Ser. No. 572,969, filed Apr. 30, 1975, of William Laskow and Robert Morelock, there is described a method for making silicon carbide-silicon matrix composites by the infiltration of carbon fibers by molten silicon. Although the resulting silicon carbide-silicon matrix materials and method for making such shaped structures represented a significant advance in manufacture of high performance shaped ceramics, it has been found that in many instances the impact resistance of the shaped ceramic structures is not sufficiently high to qualify them for a variety of uses.

The present invention is based on the discovery that readily machinable reaction products also based on molten silicon infiltration can be made by effecting molten silicon infiltration into a substantially uniform blend of particulated carbon and a finely divided inorganic material substantially nonreactive to molten silicon, such as boron nitride particles.

In addition to the above-described machinable reaction products based on molten silicon infiltration, there is also provided by the present invention, silicon carbide refractory composite structures having substantially improved impact strength over shaped silicon carbide refractories of the prior art. These composites of silicon carbide or silicon-silicon carbide can have a refractory base structure, and an exterior contiguous layer of the above-described machinable reaction product based on molten silicon infiltration. The silicon carbide composites of the present invention can be made by introducing molten silicon into a mold whereby the contiguous machinable layer in contact with the base structure is formed in-situ. The latter silicon carbide base structure moreover may be formed simultaneously with the contiguous layer by molten silicon infiltration of the base structure in the form of a carbon fiber preform.

Further features of the present invention can be seen from the drawings, where in FIG. 1 there is shown a mold filled with a mixture of carbon particles and a particulated inorganic material, such as boron nitride, and above the mold there is shown silicon powder or granules in contact with carbon fiber wicks constituting a molten silicon source for infiltration into the mixture of carbon particles and particulated inorganic material.

Figure 2:
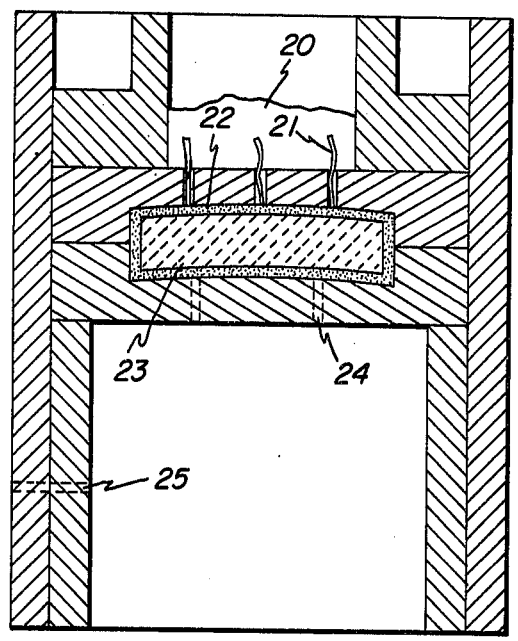

An additional aspect of the present invention can be seen by FIG. 2, showing how a silicon carbide composite can be formed in accordance with one method of the present invention based on the infiltration by molten silicon into a mold cavity containing a refractory base structure in contact with a contiguous preform consisting of a mixture of carbon particles and a particulated inorganic material. The source of the silicon is contained in the space above the mold cavity.

Figure 3:
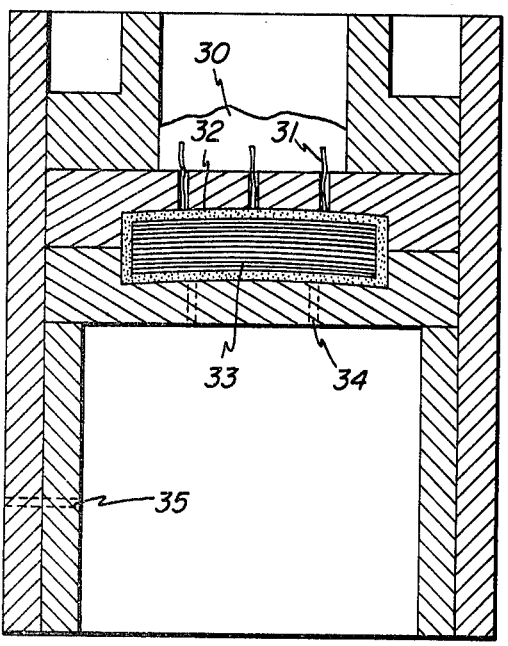

Another feature of the present invention can be seen from FIG. 3, where there is shown silicon in contact with carbon wicks above a mold. The mold is filled with a carbon fiber preform which is surrounded by a contiguous preform of a mixture of particulated carbon and a particulated inorganic material.

Figure 4:
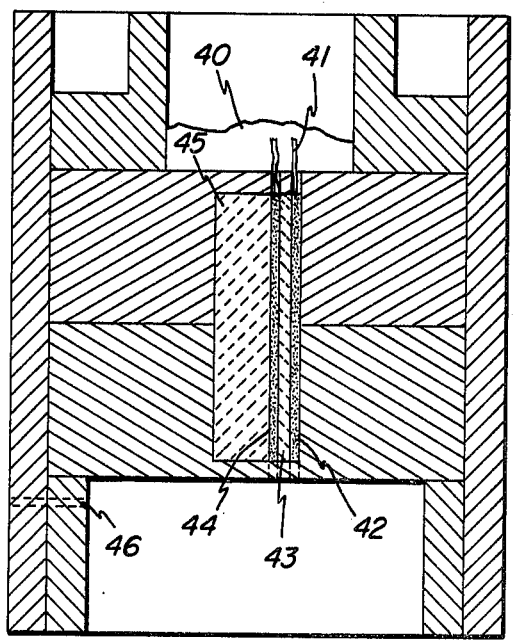

An additional aspect of the present invention can be seen from FIG. 4, showing the use of a multilayer contiguous preform on a base structure to produce a further modification of the composite of the present invention.

As shown by FIG. 1, there is provided by the present invention, machinable castings having a density of from 1.6 g/cm$^3$ to 2.7 g/cm$^3$ which are the infiltration products of reaction of molten silicon and a substantially uniform mixture comprising by volume (A) from 45% to 90% of particulated carbon having up to an equal proportion by volume based on the volume of (A), of silicon carbide particles, and (B) from 10% to 55% of a particulated inorganic material substantially inert to molten silicon at temperatures up to 1600° C. having an average particle size of from 0.1 to 2000 microns and a Mohs hardness value falling within the range of 1-7.

The machinable castings of the present invention can be initially molded into any desired configuration and thereafter cut by conventional means. These relatively light weight silicon carbide containing materials resulting from the infiltration by molten silicon into the mixture containing carbon particles can be cut with a steel saw, drilled, sanded, filed, etc., to any desired shape. If desired to be used as a protective impact resistant coating or layer, the machinable castings can be welded at a self supporting thickness onto a silicon or silicon carbide substrate to improve the substrate impact strength. This procedure can be used as an optional alternative to the procedure shown by FIG. 2, where the machinable layer is cast in-situ.

In addition to the above described uses, the machinable castings of the present invention can be cut to a thickness of from 0.01 to 1 or more inches and used as thermal gradient barriers on various substrates where attachment can be achieved by mechanical insertion, bolting, etc., combustors in such applications as diffusers, transition pieces, etc. Other uses are, for example, molds for metal casting, gas burner components, tooling, lap surface plates, and high temperature fixtures.

There is also provided by the present invention a method for making a silicon carbide composite, comprising a refractory base structure and a contiguous machinable or compliant layer structure, which comprises, (1) introducing molten silicon into a mold substantially filled with a composite having a base structure, and a contiguous exterior layer, where the base structure is a member selected from
  (i) a shaped mass of silicon carbide,
  (ii) a composite of silicon and silicon carbide, and
  (iii) a carbon fiber preform
and the contiguous exterior layer comprises a uniform mixture of particulated carbon and a particulated inorganic material substantially non-reactive to molten silicon and having a Mohs hardness in the range of from about 1 to about 7, (2) allowing the molten silicon to fully infiltrate into said mold, while allowing gases of reaction to vent therefrom and (3) removing the resulting silicon carbide composite from the mold.

Included by the types of particulated carbon which can be used in making the machinable castings of the present invention, or the contiguous layers on the composites of the present invention are carbon fiber or graphite fiber, carbonized plant fibers, lamp black, finely divided coal, wood, charcoal, etc. The particulated inorganic material which can be employed in combination with the carbon particles includes, for example, boron nitride, aluminum oxide, magnesium oxide, silicon nitride, etc., having an average aggregate size of from 1 to 2000 microns. It is understood that individual crystallites or subparticles which may comprise the aggregates can be substantially smaller.

The machinable castings of the present invention also can include the reaction product of molten silicon and the mixture of carbon fiber, or graphite fiber, or mixtures thereof, and the aforedescribed inorganic material which mixture can also comprise up to 50% by volume of other fillers, such as silicon carbide whiskers, or other particulated forms of silicon carbide. In addition to silicon carbide, other filler materials also can be used which are substantially nonreactive to molten silicon and include, for example, aluminum oxide, or zirconium oxide filaments. It may be advantageous to coat such filler materials with carbon, for example, by pyrolytic deposition from carbonaceous gas or gas mixture. The carbon coating promotes wetting and provides a chemical barrier between the oxide and the filament. The mixture of carbon fiber and inorganic material, such as boron nitride, can be present in the mold either in the form of a free flowing powder, or as a rigid preform which can be made by mixing together the inorganic material and optionally any other filler with a bonding agent for graphite, or carbon fiber, such as the graphite suspensions available from the Dylon Company. In accordance with the method of the present invention, shaped parts made from the carbon fiber and inorganic material containing mixture have improved impact resistance and abradability.

In FIG. 1, there is more particularly shown apparatus for making the machinable castings of the present invention. There is shown a side view of a mold support at 10 and a powdered silicon charge at 11. Infiltration by molten silicon into the mixture of particulated carbon and particulated inorganic material at 13 can be effected at temperatures of 1400° C. to 1700° C. through wicks at 12 which can be carbon fibers, such as WYK braid, or WYB tow of Union Carbide typical lengths being 3 CM. At 14 and 15 hot gas vents are provided to relieve build-up of mold pressure.

Melting of the powdered silicon can be effected by placing the apparatus of FIG. 1, into a suitable furnace. If desired, heating coils can be used to surround the powdered silicon source. A mold release agent, such as boron nitride, can be sprayed onto the inside walls of the mold, as shown in the application of William B. Hillig, Ser. No. 419,286, filed Nov. 27, 1973, now abandoned and assigned to the same assignee as the present invention.

There is further shown in FIG. 2, a side view of a mold having a base part of silicon carbide refractory at 23, which includes silicon-silicon carbide refractories. There is shown at 22, contiguous self-supporting preforms of the mixture of carbon particles and particles of the inorganic material as previously defined. If desired, the contiguous preforms can be made in a variety of shapes from pastes of the mixture of particulated ingredients by standard techniques using Dylon suspensions as previously indicated. Again, infiltration of molten silicon from the powdered source at 20 through carbon wicks at 21, can provide the in-situ formation of a composite of the refractory base and a machinable, compliant contiguous layer.

At FIG. 3, there is shown an additional way of making a composite by an in-situ procedure to form a refractory silicon-silicon carbide base and a complaint machinable exterior layer. A molten silicon source is shown at 30 and carbon fiber wicks at 31. Contiguous layers of the mixture of carbon particles and particles of inorganic material are shown at 32. At 33, there is shown a carbon fiber preform which can be fabricated by standard techniques.

As used hereinafter, the term carbon fiber or filaments includes commercially available carbon fiber as previously defined. The carbon fiber includes, for example, "high strength" graphite having a tensile psi of typically 250,000 psi, a modulus of $20 \times 10^6$ psi and a carbonized density of 1.6 g/cc, as shown by Johnson, et al. U.S. Pat. No. 3,412,062. Preferably, the carbon fiber has a specific gravity of about 1.3 to 1.5 and includes, for example, WYK braid, WYB tow of Union Carbide Corp., and other carbonized fibers, such as carbon felt. In addition to carbonized rayon fibers, any carbon fibers having a specific gravity as defined above derived from polymeric or natural organics, such as polyacrylonitrile, polyacetylene, such as shown by Krutchen U.S. Pat. No. 3,852,235, assigned to the same assignee as the present invention, polyvinyl chloride, polyvinyl acetate, etc., can be employed. The term "preform", as used hereinafter, is preferably a shaped structure of oriented carbon fibers, such as a pre-preg. To make a preform, a carbon fiber tow, braid or cloth is treated with molten was or other binder, such as cellulose nitrate, colloidal graphite, etc.

More particularly at FIG. 4, there is shown a base structure at 44, in contact with a multi-layer contiguous compliant exterior structure at 42–44. The base structure can consist of a silicon carbide refractory, as shown by FIG. 2, or a carbon fiber preform, as shown in FIG. 3. The contiguous layer structure can consist of a preform mixture of carbon particles and particles of inorganic material at 42, a middle layer of carbon fiber or carbon sheet at 43, and another preform similar to 42 and 44. Improved impact strength and toughness can be imparted to the machinable contiguous layer and the base layer upon infiltration by molten silicon.

In addition to the above described machinable castings, there is also provided by the present invention, composites comprising, (C) a contiguous machinable exterior layer, and (D) a refractory base structure, where the contiguous machinable exterior layer is the infiltration product of reaction by molten silicon and a substantially uniform mixture comprising by volume, from 45% to 90% of particulated carbon having up to an equal proportion by volume, based on the total volume of the mixture of silicon carbide particles, and from 10% to 55% of a particulated inorganic material, substantially inert to molten silicon at temperatures up to 1600° C., having an average particle size of from 0.1 to 2000 microns, and a Mohs hardness value falling within the range of 1–7, and the refractory base structure is a member selected from the class of shaped silicon carbide refractories and the infiltration product of reaction by molten silicon and a carbon fiber preform.

In accordance with the method of the present invention, the above-described composites of the present invention can be fabricated into gas turbine shroud sections, aircraft engine shroud sections, gas turbine transition pieces, diesel engine pistons and rings, heat exchange pipes, hot processing dies, combustion liners, fusion reactor hardware, wear resistant tiles, etc.

As previously indicated, in making the above composites of the present invention, the contiguous machinable layer can be applied onto the base structure either directly or by in-situ formation based on molten silicon infiltration. For example, the contiguous layer at thicknesses of from 0.01" to 1" or more can be fabricated onto an appropriate base structure, where contiguous layer thickness may correspondingly vary from 0.1 to 100 times the thickness of the base structure.

In order that those skilled in the art will be better able to practice the invention, the following examples are given by way of illustration and not by way of limitation. All parts are by weight, unless otherwise specified.

EXAMPLE 1

A mixture of 25% by weight or 20% by volume of boron nitride obtained from the Carborundum Company, designated SHP-40 and 75% by weight or 80% by volume of a graphite suspension obtained from the Dylon Company, designated grade AE was blended to a thick paste consistancy. The paste was then molded to a flat rectangle having a ⅛" thickness and allowed to dry in the air.

A mold was fabricated from Armco Speer 580 graphite having an initial thickness of about ⅜" by machining it to produce a mold cavity of about ⅛"×⅛"×3". The inside of the mold cavity was then coated with a boron nitride aerosol. The above blend of boron nitride and graphite was then cut to size and inserted into the mold. A carbon crucible having an inside diameter of 1¼" and about 2" high having a ⅛" diameter hole drilled at the bottom and a carbon fiber wick extending through the hole was placed on top of the mold. The carbon fiber wick was WYK braid of Union Carbide and it extended about 0.125 inches above the top of the hole and also touched the above-described blend in the mold. The crucible was then charged with solid silicon pieces employing about 15% excess of the amount of silicon required to fill the mold cavity in the molten state. The assembly was transferred to a resistance furnace in which a vacuum of $1 \times 10^{-2}$ torr would be achieved. The assembly was heated to a temperature of about 1600° C. It was found that the mixture in the mold reacted immediately with the molten silicon. The mold assembly was kept in the furnace for about 15 minutes after reaching 1600° C. The mold assembly was then allowed to cool and the resulting part was removed from the mold. There was obtained a cast part having the same dimensions as the original blend of boron nitride and graphite.

Based on method of preparation, the cast part was the infiltration product of reaction by molten silicon and a mixture of 25% by weight of boron nitride and 75% by weight of graphite which expressed in terms of volume is about 20% by volume of boron nitride and 80% by volume of graphite. The density of the casting was found to be 2.1 g/cm³. The casting was then placed in a vice and cut with a steel saw to produce a specimen ⅛"×1½"×⅛". It was found that the casting was readily machinable; the remaining portion of the casting could be readily filed out with a steel file.

A 1"×2"×⅛" flat plate of the above machinable casting is placed as a contiguous layer on a 1"×2"×⅛" block of silicon carbide. The resulting composite is then furnace heated in an inert atmosphere for 15 minutes at a temperature of 1500° C. There is obtained a composite upon cooling having the machinable casting integrally welded onto the silicon carbide refractory base.

An impact test was performed to compare the impact strength of a 1"×2"×⅛" block of silicon carbide and the above composite. Impact resistance is determined by striking the surface of a test sample with a 4.5 mm ball bearing at a velocity of about 200 meters per second and at an incident angle of about 80°. It is found that the composite of the silicon carbide having the machinable casting welded on as a contiguous layer has an impact resistance superior to the impact resistance of the silicon carbide base structure free of such contiguous layer.

EXAMPLE 2

Blends of graphite and boron nitride were fabricated in accordance with the procedure of Example 1 to produce slabs having a thickness of about ⅛". A mold was then machined out of a Speer 580 graphite, in accordance with the procedure of Example 1 having a cavity of 1"×3"×0.1". The mold was coated with boron nitride. A silicon carbide part was then placed in the mold surrounded by the preformed strips of graphite and boron nitride cut to size which totally filled the mold. As shown in FIG. 2, three holes having a 0.125 diameter were cut into the top of the mold and several vent holes were drilled into the bottom of the mold. Into the holes at the top of the mold there was placed carbon fiber wicks which protruded about ⅛" above the top of the mold while contacting the boron nitride-graphite strips within the mold. Particulated silicon was then charged to the cavity above the top of the mold using about a 15% excess over that volume required in molten form to fully infiltrate the mold.

As described in Example 1, the mold and the supporting structure were placed inside of a furnace and heated to a temperature of about 1600° C. Upon being converted to molten silicon, infiltration was immediate. After about 15 minutes at 1600° C. the mold was allowed to cool.

Removal of the part from the mold was readily achieved because the mold surface had been sprayed with boron nitride prior to being filled with the carbon-boron nitride strips and silicon carbide part. Based on method of preparation there was obtained a composite of a silicon carbide refractory base having approximately a ⅛" contiguous layer of the molten silicon infiltration product of reaction by molten silicon and a mixture of graphite and boron nitride. It was found that the contiguous layer was integrally bonded to the silicon carbide refractory base.

The impact strength of the above described composite was substantially the same as the impact strength of the composite formed in accordance with Example 1 by welding the piece of the machinable casting onto the surface of the silicon carbide structure by a furnace treatment. In addition to improved impact strength, the contiguous layer was found to be readily machinable as evidenced by being readily abraded by use of a diamond saw blade which was capable of cutting into the surface of the layer at a rate of between 0.05 to 0.5" per second. The diamond wheel had a 4" diameter having a ⅜" width, a diamond grit size of 150 mesh, rotating at 5500

RPM, at a depth of 0.002" and a cutting speed of 0.2" per second, pulling forces of 90 to 600 grams were used.

EXAMPLE 3

A carbon fiber preform is prepared from low modulus WCA carbon cloth of Union Carbide Corporation, using an aqueous colloidal suspension of graphite as a binder. The carbon fiber preform was machined to a shape similar to that shown by FIG. 3. Following the procedure of Example 2, strips of boron nitride-graphite mixture which had been molded to a thickness of about ⅛" were placed in a 1"×3"×0.1" mold previously coated with boron nitride which had been machined from Speer 580 graphite. The space above the mold was then charged with silicon powder.

Following the procedure of Example 2, infiltration by molten silicon in the mold resulted in the production of a composite having a silicon-silicon carbide base structure and a contiguous layer of the reaction product of molten silicon and a mixture of graphite and graphite-boron nitride. The impact strength of the aforementioned composite as tested in accordance with the procedure of Example 1, showed that it exhibited improved impact as compared to a silicon-silicon carbide refractory part which was molded from the same mold without the use of the exterior graphite-boron nitride contiguous layer allowing for the use of a proportionately larger carbon fiber preform which was sufficient to completely fill the mold cavity.

EXAMPLE 4

As shown by FIG. 4, a mold was vertically fabricated to accommodate a carbon fiber preform in the mold adjacent to a multi-layer contiguous structure consisting of carbon cloth sandwiched in between two strips of a graphite-boron nitride blend which was fabricated in accordance with Example 1. Prior to the incorporation of the carbon fiber preform and the aforementioned contiguous layer structure, the mold surface had been coated with boron nitride in a standard manner. Molten silicon infiltration was effected in accordance with the procedure of Example 2. Upon cooling a composite part was separated from the mold. It was found that molten silicon infiltration occurred in the contiguous graphite-boron nitride layers and the carbon fiber preform. Infiltration also occurred in the intermediate layer of carbon cloth constituting part of the contiguous layer. It was further found that the contiguous layer on the silicon-silicon carbide refractory substrate was somewhat tougher and less machinable than the contiguous layer of Example 2. However, the impact resistance of the resulting composite is superior to that of Example 2.

Although the above examples are limited to only a few of the very many variables and compositions which can be employed in the practice of the present invention, it should be understood that the present invention is broadly directed to machinable castings as set forth in the broad description preceding these examples as well as composites of silicon carbide having a machinable contiguous layer which can be formed in accordance with the practice of the present invention as well as a method for making such composites.

What we claim as new and desire to secure by Letters Patent of the United States is:

1. Composites comprising,
    (A) a contiguous machinable exterior layer, and
    (B) a refractory base structure, where the contiguous machinable exterior layer (A) is the infiltration product of reaction by molten silicon, and a substantially uniform mixture comprising by volume,
    from 45% to 90% of particulated carbon having up to an equal proportion by volume, based on the total volume of the mixture, of silicon carbide particles, and
    from 10% to 55% of a particulated inorganic material selected from the class consisting of boron nitride, aluminum oxide, magnesium oxide, and silicon nitride, substantially inert to molten silicon at temperatures up to 1600° C., having an average particle size of from 0.1 to 2000 microns, and a Mohs hardness value falling within the range of 1-7, and the refractory base structure (B) is a member selected from the class of shaped silicon carbide refractories and the infiltration product of reaction by molten silicon and a carbon fiber preform.
2. A composite in accordance with claim 1, where the contiguous layer is based on the infiltration by molten silicon into a mixture of carbon particles and boron nitride particles.
3. A composite in accordance with claim 1, where the refractory base structure is a silicon carbide substrate.
4. A composite in accordance with claim 1, where the refractory base structure is a silicon-silicon carbide substrate.
5. A composite in accordance with claim 1, where the contiguous layer is a multi-layer infiltration product of reaction of a mixture of boron nitride and carbon particles on both sides of an intermediate carbon fiber layer.
6. A composite in accordance with claim 1, in the form of a gas turbine shroud section.
7. A composite in accordance with claim 1, in the form of an aircraft engine shroud section.
8. A composite in accordance with claim 1, in the form of a gas turbine transition piece.

* * * * *